United States Patent
Wittgreffe et al.

(10) Patent No.: US 6,253,208 B1
(45) Date of Patent: Jun. 26, 2001

(54) INFORMATION ACCESS

(75) Inventors: John P. Wittgreffe, Ipswich; Habib Zaiour, London, both of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/052,002

(22) Filed: Mar. 31, 1998

(51) Int. Cl.⁷ .................................................. G06F 17/30
(52) U.S. Cl. ........................... 707/104; 707/10; 707/100; 707/103; 707/104; 707/501; 707/513; 705/14; 705/20; 705/26; 709/203; 709/217; 709/219; 380/24; 380/25
(58) Field of Search ............................... 707/3, 4, 5, 10, 707/100, 103, 104, 501, 513, 524; 705/14, 20, 23, 26, 27; 709/203, 217, 219; 382/224; 380/24–25

(56) References Cited

U.S. PATENT DOCUMENTS

| | | | | |
|---|---|---|---|---|
| 5,625,711 | * | 4/1997 | Nicholson et al. | 382/224 |
| 5,764,906 | * | 6/1998 | Edelstein et al. | 709/203 |
| 5,778,368 | * | 7/1998 | Hogan et al. | 707/10 |
| 5,850,446 | * | 12/1998 | Berger et al. | 380/24 |
| 5,859,972 | * | 1/1999 | Subramaniam et al. | 395/200.33 |
| 5,889,863 | * | 3/1999 | Weber | 380/25 |
| 5,897,622 | * | 4/1999 | Blinn et al. | 705/26 |
| 5,913,210 | * | 6/1999 | Call | 707/4 |
| 5,933,822 | * | 8/1999 | Braden-Harder et al. | 707/5 |
| 5,941,944 | * | 8/1999 | Messerly | 709/203 |
| 5,996,076 | * | 11/1999 | Rowney et al. | 713/201 |
| 6,009,442 | * | 12/1999 | Chen et al. | 707/522 |
| 6,178,409 | * | 1/2001 | Weber et al. | 705/79 |

OTHER PUBLICATIONS

Bara. M. et al., "Symmetric adaptive customer, modeling in an electronic store", Third IEEE Symposium on Computers and Communications, 1998. ISCC '98 Proceedings., Jun. 3–Jul. 2, 1998, pp. 348–352.*

Douglis, Fred et al., "WebGuide: Querying and Navigating changes in Web Repositories", Fifth International World Wide Web Conference, May 6–10, 1996, paris, France.*

Srinivasan, Raghav et al., "Maintaining Temporal Coherency of Virtual Data Warehouses", The 19th IEEE Real–Time Systems Symposium, 1998 Proceedings, Dec. 2–4, 1998, pp. 60–70.*

* cited by examiner

Primary Examiner—Hosain T. Alam
Assistant Examiner—Shahid Alam
(74) Attorney, Agent, or Firm—Nixon & Vanderhye P.C.

(57) ABSTRACT

An information access system is provided to create and maintain a rapidly accessible index to information extracted from information sources accessible over the Internet. The information access system may be tailored to extract, analyse and index information obtained via the public query interfaces to a number of predetermined information databases. Information may be extracted from the information databases by submitting appropriate query requests to their query interfaces and analysing data returned in response. Query requests may be stored and maintained by the information access system in query files. Query responses may be analysed by one or more query result analysis modules, each module being tailored to convert information supplied by a particular site into a common format for storage in an index. New information may be identified and reported to users. The information access system may be applied, in particular to commercial property trading.

20 Claims, 3 Drawing Sheets

INFORMATION ACCESS

TECHNICAL FIELD

The invention relates to electronic commerce and in particular to an information access system.

BACKGROUND OF THE INVENTION

The Internet is a multimedia computer communications network built on worldwide telephone and data networks. Over 100,000 servers of various types are connected to the Internet providing a publicly accessible distributed data store. A server holding files of information as data accessible using an Internet communication protocol called the "HyperText Transfer Protocol" (HTTP) is known as an "HTTP server". Data files stored on HTTP servers and accessible by means of HTTP are known as "web pages" which together form the "World Wide Web", or simply the "WEB". Web pages are written using a special WEB language called HyperText Markup Language (HTML) creating links to other pages on the WEB, as appropriate, and providing a means to navigate through information on the WEB. Information held on the WEB is accessible to anyone having a computer connected to the Internet and with an interest in accessing it. An HTTP Uniform Resource Locator (URL) has been adopted as a WEB standard to provide a consistent international naming convention to uniquely identify the location of any WEB resource, including for instance documents, programs, sound and video clips. The HTTP enables URL-identified files (web pages) to be located and transferred for reproduction at user equipment connected to the Internet. Underlying transport protocols, primarily TCP/IP, enable connections to be established, between an Internet user and a WEB server for example, for the intercommunication of data.

SUMMARY OF THE INVENTION

Internet users may access information on the WEB using proprietary WEB browser products running on personal computers (PCs) or workstations linked to the Internet. WEB browsers communicate with WEB resources using standard Internet protocols to download selected web pages, interpret embedded HTML commands inserted at the time of markup by web page authors and, if appropriate, display those pages graphically. Browsers are available to reproduce multi-media files transferred over the Internet.

It is known to provide a public Internet query interface to a database of information relating to goods and services for sale. For example, an electronic price list of a retail outlet or mail-order business may be accessible over the Internet via a simple query form enabling prospective customers to extract information and prices on particular products. It is also known to provide a proxy search engine whereby a user may submit a single on-line query to the proxy engine which in turn submits the query to a number of predetermined third party information sources on behalf of the user and collates the results. For example, on-line shopping services have been provided for example, by Yahoo! Inc via the Internet at HTTP Uniform Resource Locator (URL) http://www.yahoo.com/ providing proxy search facilities in a number of different retail product categories.

In the commercial property sector, it is known for estate agents and other brokers of property to make their property listings or databases available on the Internet. A property listing may be presented to Internet users as a simple web page. Alternatively, a simple query interface may be provided to a property advertiser's database with facilities to search for a particular property specification and to view the results on-line. A query result may typically comprise a summarised list of matching properties with embedded HTML hyperlinks to other pages of details from the database. A user interested in purchasing or renting a commercial property advertised on the Internet would need to access each of the individual sites via their public interfaces, submit an appropriate query in a required format, or read information provided using the facilities available at the site, in order to obtain a shortlist of suitable properties. However, any one property agent is likely to advertise only a relatively small number of properties at any one time. A prospective buyer may therefore need to visit almost all the known advertisers to gather a reasonable sample of suitable property. This process can be very time-consuming. A similar problem arises in respect of other products or services of a relatively specialised nature or of high monetary value; at any one time an advertiser may have only a relatively small selection available.

SUMMARY OF THE INVENTION

In a first aspect of the present invention there is provided an information access system comprising:
a communications interface;
query submission means;
a query result analyser;
information storage means; and
triggering means;
wherein the information access system is arranged, in operation, to respond to an output of the triggering means to do the following:
using said communications interface, to establish a network connection to a predetermined network address;
using said query submission means, to select a query from a set of one or more predetermined queries and to transmit the selected query, via the communications interface, over said network connection, according to a predetermined communications protocol;
using said query result analyser, on receipt of data over said network connection in response to said transmitted query, to extract information of a predetermined type from the received data and to format the extracted information according to a common format; and
using said information storage means to store the formatted information in an index.

An information access system according to the invention may be arranged to create and maintain a rapidly accessible index to particular types of product or service or other information held at a number of predetermined information sources accessible over a communications network. In particular, the information access system may include means to submit a predetermined query request to each predetermined information source, each source having an interface to the communications network and each query being tailored to extract relevant information from the communications interface to the source. The information access system may also be arranged to analyse information returned in response to submitted query requests and to create an index to a predetermined selection of that information. Advantageously, the information access system index may provide a single, rapidly searchable source to a critical mass of information of a particular type, without need for a user to access each of a number of potential information sources directly in the first instance.

Information returned in response to query requests may be analysed by one or more query result analysis modules, each module being tailored to convert information supplied by a particular information source into a common format for indexing.

Preferably, each predetermined query may be associated with a particular predetermined information source to ensure that all the required information may be retrieved from that source, and to maintain flexibility to amend the query as required. Similarly, each query result analysis module may be individually tailored to analyse query results returned from a particular information source.

Preferably, the information storage means of the information access system may be arranged, on receipt and prior to storage of information extracted by the query result analyser, to compare the extracted information with information already stored in the index and to identify, within the extracted information, new information not previously stored in the index. The information access system may also include requirements matching means to compare new information with a user's predetermined requirements for a particular type of information and to output the results of that comparison, for example as a report to be Emailed to the user.

Preferably, the information access system may include a search engine to enable users to submit information search requests and to retrieve matching information from the index.

Preferably, the information access system is arranged to retrieve and to index information available from information sources having a public communications interface to the Internet.

In a second aspect, there is provided a property trading system comprising:
a communications interface;
query submission means;
a query result analyser;
information storage means;
triggering means; and
a search engine;
wherein the property trading system is arranged, in operation, to respond to an output of the triggering means to do the following:
using said communications interface, to establish a network connection to a predetermined network address;
using said query submission means, to select a query from a set of one or more predetermined queries and to transmit the selected query, via the communications interface, over said network connection, according to a predetermined communications protocol;
using said query result analyser, on receipt of data over said network connection in response to said transmitted query, to extract information of a predetermined type from the received data and to format the extracted information according to a common format; and
using said information storage means to store the formatted information in an index;
and wherein the search engine is arranged to retrieve information, stored in the index, in response to received property search requests.

BRIEF DESCRIPTION OF THE DRAWINGS

Embodiments of the invention will now be described in more detail, by way of example only, with reference to the accompanying drawings of which.

DETAILED DESCRIPTION

Figure 1:
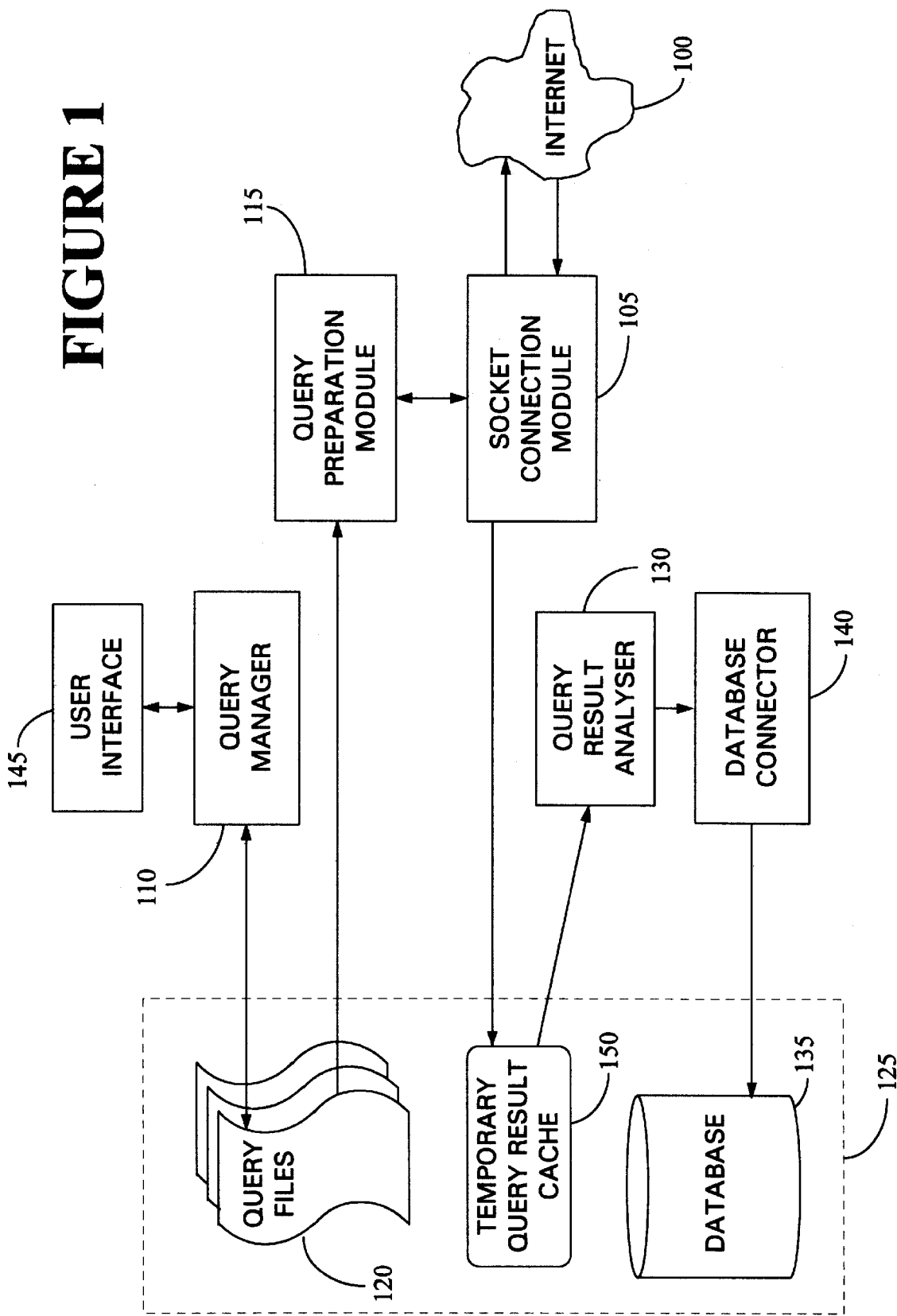
FIG. 1 is a diagram showing the main components of an information access system according to embodiments of the invention.

Referring to FIG. 1, a diagram is presented showing the main functional components of an information access system according to embodiments of the invention. The information access system includes a Network Connection Module 105 arranged with access to the Internet 100. The network connection module 105 comprises a known Internet transport protocol stack, TCP/IP for example, and a physical connection to the Internet 100. The network connection module 105 may be arranged to establish a network connection between the information access system and a WEB interface to a database on a specified third party internet site. All communication between the information access system and third party Internet sites may take place via the network connection module 105. The information access system includes a Query Manager 110, with an associated User Interface 145, and a Store 125. The User Interface 145 is arranged to provide user input facilities under the control of the Query Manager 110 to enable queries to be entered and stored in Query Files 120 in the store 125 and to enable amendments to be made to those files as required. The information access system includes a Query Preparation module 115, arranged with access to the store 125 to read query files 120, and with access to the network connection module 105 to enable selected queries to be transmitted over an established network connection. Results of a query, returned from a particular third party Internet site via the network connection module 105, may be collated in a Temporary Query Result Cache 150, stored for example in the store 125. The information access system includes at least one Query Result Analysis module 130, each tailored to analyse query results held in the cache 150 from a particular third party site and to extract relevant information. A different query result analysis module 130 may be selected according to the site whose query results are to be processed. The Query Result Analysis module 130 is arranged to output a file of processed query results and to pass the file to a Database Connector module 140 for storage of the processed query results in a Database 135, held in the store 125.

The functionality of each component of a preferred information access system may be implemented using a known computer programming language, C for example, designed to operate over one or more known computers, at least one of which is provided with a suitable network connection to the Internet. The overall functionality of the information access system according to embodiments of the invention may be controlled by means of a known scripting language, for example the Shell Scripting Language provided under the UNIX operating system. The controlling shell script of the information access system may be arranged to activate particular components in an appropriate order and to pass information between those components.

Figure 2:
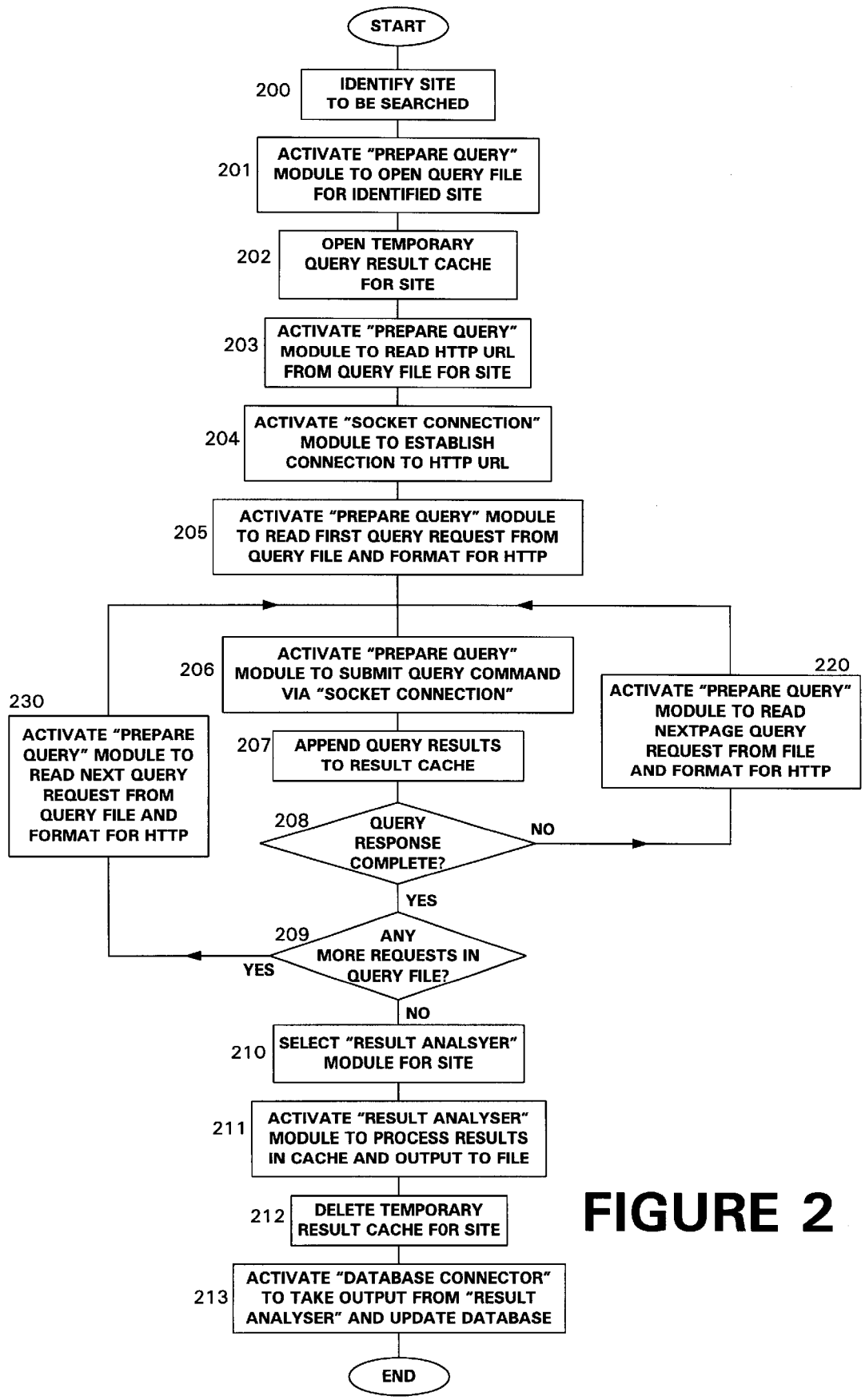
FIG. 2 is flow diagram indicating the steps in operation of an information access system according to a particular embodiment.

Referring to FIG. 2, a flow diagram is presented to show a typical sequence of steps coded in a shell script controlling the operation of the information access system in a particular embodiment. The sequence begins at STEP 200 with selection of a third party Internet site to be searched. Preferably the selection of the site may take place automatically according to a predetermined "Search Schedule" monitored by the Shell Script. At STEP 201 the Prepare Query module 115 may be activated to open a query file 120 appropriate to the selected site. At STEP 202, a temporary cache may be opened in the store 125 for collation and temporary storage of returned query results. Use of a temporary cache 150 in this way may maximise the performance of subsequent results processing by the Result Analyser 130. At STEP 203 the Prepare Query module 115 may be activated to read the query file 120 and to extract the HTTP URL, stored therein, of the Internet interface to the selected site. At STEP 204 the Network Connection module 105 may be activated to establish a network connection to the HTTP URL over the Internet. This URL will generally refer to a localised search facility on the selected site with an interface involving the Common Gateway Interface (CGI)-GET protocol for example. At STEP 205 the Prepare Query module 115 may be activated to read the first part of the query from the query file 120 and to format a query request as an HTTP message ready for transmission. At STEP 206 the Prepare Query module 115 may be activated to submit the formatted query message to the Network Connection module 105 for transmission over the established network connection to the selected site, the HTTP protocol being controlled by the Prepare Query module 115. At STEP 207, any query results received over the network connection may be stored in the temporary result cache 150 in the store 125, appended to results stored from preceding parts of the query. Preferably, the Prepare Query module 115 may be arranged to monitor query results to determine whether, at the end of a page, all results of the latest query request have been returned or whether one or more further pages of results remain to be transmitted by the site. At STEP 208 therefore, the Prepare Query module 115 determines whether or not the expected response to the latest query request is complete. If the response is not complete, then at STEP 220 the Prepare Query module 115 may be activated to read a "NextPage" request Uniform Resource Identifier (URI) from the query file 120, to format the request as an HTTP message and then, at STEP 206, to transmit the formatted request over the established network connection via the Network Connection module 105. This loop in operation may continue until all pages of results are returned by the site in response to the latest query request.

If, at STEP 208, the response to the latest query result is found to be complete, then at STEP 209 the Prepare Query module 115 may determine whether or not any further parts of the query remain to be transmitted from the query file 120. If a query part remains to be transmitted, then at STEP 230 the Prepare Query module 115 may be activated to read the next part from the query file 120 and to format it as an HTTP request message before, at STEP 206, being activated to transmit the formatted request over the network connection.

If, at STEP 209, all query parts are found to have been transmitted, and the results successfully collated in the temporary cache 150, then at STEP 210 a Result Analysis Module may be selected for the Query Result Analyser 130, appropriate to the site whose results have been gathered. In practice, each Result Analysis module may be individually tailored to analyse the results cached from a particular site, although the results from several sites may be quite similar and may be analysed using Result Analysis modules differing only in minor coding variations on a common template. At STEP 211 the Query Result Analyser 130 may be activated to process the results stored in the temporary result cache 150 and to output data, preferably to a file. At STEP 212, with the query results analysed successfully by the Query Result Analyser 130 and the output generated, the temporary result cache 150 may be deleted for the selected site having fulfilled its purpose. At STEP 213 the Database Connector may be activated to take the output from the Query Result Analyser 130 and to use the information therein to update the Database 135. The operation of the information access system then ends in respect of the selected site on that occasion.

As mentioned above, the controlling Shell Script according to a particular embodiment may include means to monitor a "Search Schedule" comprising the intended dates and times of operation of the information access system in respect of each of one or more predetermined third party sites to be searched. Such a feature enables the operation of the information access system to be triggered automatically at the scheduled dates and times.

With reference to FIG. 1, particular embodiments of each component of the information access system will now be described in more detail.

Query Manager 110/User Interface 145

Preferably, the role of the query manager 110 is to enable queries to be defined and recorded in query files 120. In particular, the query manager 110 provides functionality to support a user interface 145 enabling an administrative user of the information access system to search for particular character strings in queries or to add, change, delete or view queries and query files. The query manager 110 provides, essentially, a text editor with access to the store 125. In a simple implementation, the query manager 110 may provide the following menu of options at the user interface 145:

---

=========Menu=========
S)earch
A)dd
C)hange
D)elete
V)iew all
E)xit
=======================>

---

Query Files 120

Preferably, one identifiable query file 120 may be stored in the store 125 in respect of each predetermined third party Internet site to be searched. A query file 120 may record all the information necessary to enable the information access system to establish a network connection over the Internet with a public query interface to the respective Internet site, to submit appropriate queries in the form of HTTP requests to the site to extract relevant information and to collate query results returned by the site in an identifiable cache file. To this end, a query file 120 may record the HTTP URL of the public Internet interface to the respective site and may record one or more uniform resource identifiers (URI) known to define the information to be extracted. A query file 120 may include further information to enable the information access system to interact more successfully with the site's query interface. For example, if appropriate, the query file 120 may record a particular character string known to be included in a page of returned query results as an indication by the site that the page is the last page of results, or that at least one further page is yet to be transmitted by the site. The defined character string may be sought by the information access system and an appropriate request submitted, also recorded in the query file 120, to trigger transmission of the next page of results by the site while further pages remain, or until the last page is detected. Alternatively, and more simply, a search of a particular site may be limited to a maximum number of pages, configured by default to be twice the expected number of pages of results data expected from that site in response to a particular query request, so that a sufficiently large number of query requests may be submitted to extract up to the maximum number of pages configured.

The following is an example of the contents of a query file 120 relating to a particular internet site—the "BTProperty" internet site—to be searched by the information access system according to a particular embodiment of the invention applied to the commercial property market. The following listing of the query file 120 may be provided at the user interface 145 to the query manager 110 for example, in response to a "V)iew all" command at the menu shown above.

```
SITE: BTProperty
==================
    Record              : 1
    The URL is          : www.btproperty.co.uk/commercial/
                          search_list.cgi
    the QueryString is  : category=industrial&keyword=&strict=no
    the NextPage is     : /commercial/search_list.cgi/category=
                          industrial&keyword=&strict=no&page=,1
    the query method is : GET
    the FileName        : ResultBTProperty
    Max result retrieved : 12
==================
    Record              : 2
    The URL is          : www.btproperty.co.uk/commercial/
                          search_list.cgi
    the QueryString is  : category=office&keyword=&strict=no
    the NextPage is     : /commercial/search_list.cgi/category=office&
                          keyword=&strict=no&page=,1
    the query method is : GET
    the FileName        : ResultBTProperty
    Max result retrieved : 35
==================
    Record              : 3
    The URL is          : www.btproperty.co.uk/commercial/
                          search_list.cgi
    the QueryString is  : category=retail&keyword=&strict=no
    the NextPage is     : /commercial/search_list.cgi/category=
                          retail&keyword=&strict=no&page=,1
    the query method is : GET
    the FileName        : ResultBTProperty
    Max result retrieved : 5
==================
    Record              : 4
    The URL is          : www.btproperty.co.uk/commercial/
                          search_list.cgi
    the QueryString is  : category=sites&keyword=&strict=no
    the NextPage is     : /commercial/search_list.cgi/category=
                          sites&keyword=&strict=no&page=,1
    the query method is : GET
    the FileName        : ResultBTProperty
    Max result retrieved : 5
==================
```

The query defined in the above query file listing is designed to extract a list of all the commercial property held in the "BTProperty" site database. In this example it has been determined that the information access system must submit a four part query to the BTProperty site's query interface for all the required information to be extracted and returned to the information access system. In this example, the "URL" is the HTTP URL of the public Internet query interface to the BTProperty site; the "QueryString" is a request-URI defining the information to be retrieved from the site—in this example four query requests must be submitted, each using a different "QueryString"; the "NextPage" defines a query request-URI defining the next page of query results from the BTProperty query interface in response to the previous request "QueryString"; and "FileName" is the name of the file—in this example "ResultBTProperty"—to be used by the information access system to store the query results returned by this particular site. Some third party query interfaces may allow all required information to be extracted from the site using a single "QueryString".

The "Max result retrieved" field defines the maximum number of pages of results to be retrieved from the site using "NextPage" query requests. As mentioned above, this number is based, by default, upon twice the number of pages of query results expected from the site in response to the corresponding query request. It is used in the case where it is not possible to detect a character string identifying the last page of results or indicating that further pages remain to be transmitted by the site. The number is used in an attempt to ensure that sufficient NextPage requests are submitted to retrieve all the available results from the site.

In the above example, the query file 120 also records the common HTTP method to be specified with an HTTP-formatted query message to the site—in this example a "GET" method.

Query Preparation Module 115

When a predetermined Internet site is to be searched, as selected and triggered under the control of the information access system shell script described above, the Query Preparation module 115 may be activated to perform a number of roles in relation to submission of queries and collation of query results. In particular, the prepare query module 115 may open the query file corresponding to an Internet site specified by the shell script, read the contents of the file to extract the site URL to enable a network connection to be established to the site (by the network connection module 105) and read details of the query to be submitted. Preferably, the query preparation module 115 may be arranged to implement the Hypertext Transfer Protocol (HTTP) for the information access system in communicating with third party Internet sites. This role includes formatting a query into an HTTP request message and submitting the message to the network connection (105) for transmission. The role also involves monitoring data, typically in the form of Hypertext Mark-up Language (HTML) pages, returned by the site in response to a submitted query request message, storing the data in a temporary result cache 150 and, if necessary, submitting to the site further request messages as identified in the query file to extract all available pages of query results.

Having submitted a query request message, the query interface to the third party site typically returns results as pages of limited length and in blocks of one or more pages. However, it is often not easy to determine, electronically, whether at the end of a page further pages are awaiting transmission by the site. A browser interface displaying the query results to a user may provide a visible HTML "hotspot" on the page, selectable directly by "clicking" on the hot-spot to despatch an underlying instruction to the site to send the next page. However, when monitoring the returning results with a computer program for example, it is more difficult to determine whether or not the end of a page is the end of the query response. If it is known that a particular character string will be included by the site within a result page to indicate that either that further pages remain to be transmitted or that the current page is the last page, then that character string may be defined in the query file 120 for use by the query preparation module 115. The query preparation module 115 may read the character string from the query file and search for it in the data stream returned from the site to determine the end of results. The query preparation module 115 may read the "NextPage" request-URI from the query file and submit it as an HTTP request message to obtain the next page of results, repeating this process until all pages are returned.

Where it is known not to be possible to detect the end of results by means of a character string, then as mentioned above, the information access system, by means of the query preparation module 115, may attempt to ensure that sufficient NextPage query requests are submitted to capture all expected results, up to a maximum number of pages as indicated by the "Max result retrieved" parameter in the query file example above. In that query file example, the NextPage character string includes, at the end, an indication of the number of pages known to be returned in response to each NextPage query request, in this example—one—as indicated by ",1". The ",1" may be included for use by the Query Preparation Module 115 to indicate that on each consecutive submission of a NextPage query request the page number requested should be incremented by 1 until the "Max result retrieved" total is reached. For example, NextPage query request-URIs would end ". . . &page=1", ". . . &page=2", ". . . &page=3", etc. in this case. If, for example, the NextPage string included ",10" at the end, indicating that ten pages are returned in response to each NextPage query request, then the page number would be incremented by 10 on each subsequent submission until the "Max result retrieved" total has been reached, e.g. ". . . &page=1", ". . . &page=11", ". . . &page=21", etc.

In the event that an character string may be detectable in a page of query results from a particular site to identify the last page of results, the query file may include, in place of the "Max result retrieved" field, a "LastPageFlag" field specifying the character string to be sought by the query preparation module 115 in returned results.

Result Analyser 130

Preferably, the role of the Result Analyser 130 is to extract from the query results of each predetermined site all the information necessary to update the database 135 for a particular application of the information access system. The result analyser 130 may take as input the contents of a temporary result cache 150 for that site and may generate analysis results in a standard format, employing standard terms to describe data entities, irrespective of the source of the query results.

Operation of the Result Analyser 130 may be triggered by the information access system shell script, as described above, upon successful collation of query results in the cache 150 from a particular site. The result analyser 130 may comprise at least one query result analysis module, selectable by the controlling shell script, depending upon the Internet site whose results are to be analysed. Each query result analysis module may be tailored to analyse query results from a particular site only. Advantageously, a result analysis module dedicated to the analysis of results from one site may be arranged to operate more simply than a single module attempting to analyse query results from a number of different sites. In general, amendments to accommodate changes in the format of query results may be made more easily to an analysis module dedicated to that site than to a multi-site analysis module.

A result analysis module may be arranged to parse data held in the temporary results cache 150 of a particular site to extract predetermined information entities. A result analysis module may locate relevant information in a results cache 150 using a combination of known text processing techniques. For example, searching for particular keywords or phrases known to be used by the respective site to identify relevant information or using templates based upon the known structure of result tables from a particular site to locate particular information based upon its likely position within the table. The scope of information to be extracted from the results cache may be predetermined according to the scope of information to be stored in the database 135. In the field of commercial property for example, only brief summarising information may be extracted about each property for storage in the database 135, including an HTTP reference to enable a link to be made to the originating site should full details be required by a user for a particular property.

In general, each result analysis module may perform an appropriate translation from terms used by a third party site to describe relevant data entities into standard terms for the information access system. For example, in the case of a commercial property application, a term known to be used by a particular property agent to represent a property type may be translated into one of a predetermined set of property types established for the information access system. For example, valid property types for the information access system may include 'Office', 'Retail', 'Industrial', 'Warehouse', 'Land' and 'Site'. If a result file from the property agent includes a term "Shop" as a property type, the corresponding result analysis module may translate "Shop" into "Retail" when creating the output file.

Preferably, output from the result analyser 130 may take the form of a data table of predetermined structure. In a commercial property application, each property may occupy one or more rows within the table, each property attribute (such as "Type") occupying a different predetermined column within the respective row. Alternatively, the database connector 140 may be arranged to receive results directly from the result analyser 130 and to process them in real time.

Database Connector 140

The Database Connector 140 may be arranged to update the database 135 with information supplied in output from the Result Analyser 130. In a simple embodiment, the database connector may simply regenerate that part of the database 135 attributable to a particular third party site on receiving a new result output for that site from the result analyser 130. Preferably, a more sophisticated update process may be implemented by the database connector 140 by means of a comparison between information supplied in the output from the result analyser 130 and the present contents of the database 135. In this way it may be possible to detect changes to particular information records and to alert users with an interest in new information of that particular type. A facility to provide information updates to users is described in more detail below.

To support a more sophisticated update mechanism, an information record obtained from a third party site may preferably include an identifier allocated by the site's database itself to uniquely differentiate records within the site. Such identifiers may be extracted from the query results, where available, by the result analyser 130 and included in the output to the database connector 140. The database 135 may record the identifiers allocated by the site for each respective information record so that, on comparing the present contents of the database 135 with the contents of the latest result analysis output for the site, the database connector 140 may recognise new information records, records to be deleted from the database 135 or amendments to existing records. Use of an id from the originating database helps to avoid creation of duplicate records in the database 135 caused, for example, when a property address has been corrected in the originating database since a previous query submission and the database connector recognises the amended record as a new property.

The database connector 140 may be arranged to update or to recreate any index files used within the database, either during or following update of individual database tables. The database management system, ORACLE for example, may provide facilities to automatically update or recreate index files.

Database 135

Figure 3:
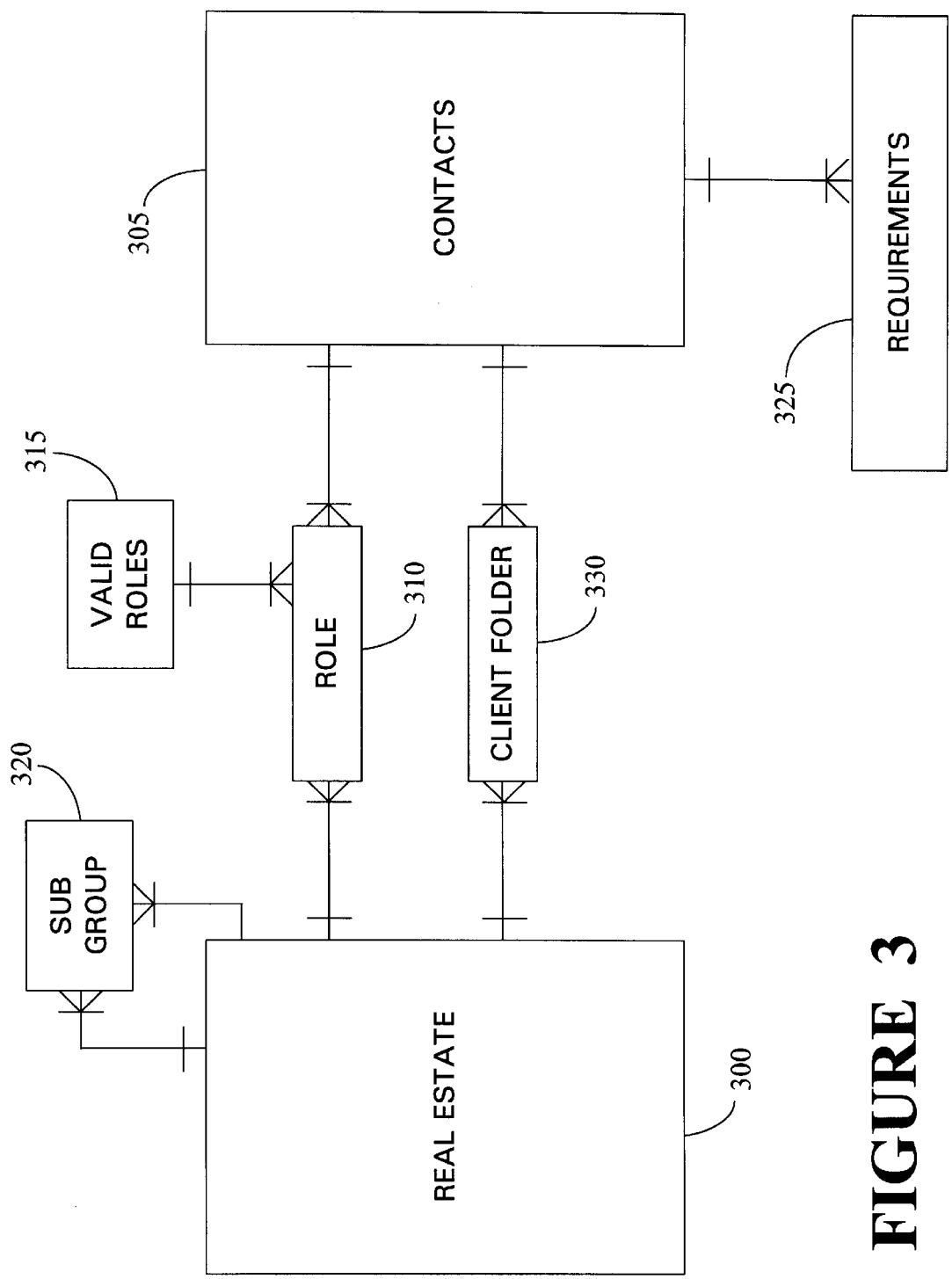
FIG. 3 is a diagram showing the structure of a commercial property database incorporated within an information access system according to a particular embodiment.

Referring to FIG. 3, a diagram is presented to show the normalised structure of a database 135 employed in a particular embodiment of the invention as applied to a commercial property trading system. A Real Estate file 300 is provided, containing a record for each individual property identified by the result analyser 130 from the query results. A Contacts file 305 contains a record of all the known contacts associated with property contained in the Real Estate file 300, in particular all those contacts identified by the result analyser 130 from the query result files. Records in the Real Estate file 300 may be associated with records in the Contacts file 305 by means of the Role file 310. The Role file 310 comprises a record for each association between a record in the Real Estate file 300 and a record in the Contact file 305, including an indication of the nature of role of the contact with respect to the property. A list of valid roles for use in the Roles file 310 may be maintained in a Valid Roles file 315.

Preferably, the database 135 may be arranged to record a minimum set of related information about each property for sale or for rent, likely to be common to all commercial property extracted from the temporary results cache 150 by the result analyser 130. The scope of information stored may be sufficient to support no more than a basic commercial property search of the database 135. Preferably, a publicly accessible Internet interface may be provided to the information access system database 135 including, in a commercial property trading application, means for a user to enter a query defining basic property characteristics. Such a query interface is provided, for example, in the Applicant's "Prop-Net" property trading service for the Internet, published in the applicant's "BT Technology Journal", Volume 15, No. 2, April 1997, a public trial system being made available on the Internet at http://transend.labs.bt.com/BTPropNet. A Prop-Net user may submit to the PropNet query interface a simple profile of the type of property being sought, specifying only property type, location and floor area for example. The query interface, in turn, uses the submitted profile to search the information access system database 135 for matching property and presents the results to the user as a summarised shortlist of properties. Where an associated HTTP URL is recorded in the Real Estate file 300, the query interface may display an HTML "hot-spot" to enable a user to "hyperlink" to the third party web page identified by that URL and to view full details on the property, including any other information on the property such as still or interactive video images made available by the advertiser.

The database 135 may be implemented using any one of a number of available relational database management systems.

With reference to FIG. 3, there follows a more detailed description of the structure of the property database outlined above, as implemented using the ORACLE database management system. ORACLE nomenclature is used to define the data types listed in the column "Column Type" of each table.

Real Estate table 300

The structure of a typical record in the Real Estate table 300 is shown below. Preferably, those fields with Column Names identified with a following are compulsory. That is, if the result analyser 130 is unable to extract sufficient data from a query result cache 150 to populate all the compulsory fields for a particular property, all details of the property in question may be discarded or stored separately for manual analysis by a system administrator.

| Column Name | Column Type | Comments |
| --- | --- | --- |
| re_id* | number(10) | A unique integer identifier for the real estate, generated automatically |
| name* | varchar2(255) | Name of the property |
| re_postcode | varchar2(12) | Post code |
| re_address* | varchar2(500) | Full address of property, bar post code |
| locality | varchar2(255) | A geographical region for search purposes, e.g. N Home Counties |
| re_type* | varchar2(500) | Type of real estate |
| floor_area* | number(7,2) | The total floor area in sq m (for retail property this is the sales area only) |
| sale_price | number(10,2) | Price in sterling |
| annual_rent | number(10,2) | Annual rent in sterling |
| status | varchar2(30) | |
| re_htmlref | varchar2(255) | A reference to an HTML page for the property |

In the real estate table 300, the 're_type' field may accept any value other than NULL (blank). However, the result analyser 130 may be arranged to use only the standard keywords 'Office', 'Retail', 'Industrial', 'Warehouse', 'Land' or 'Site'. Correspondingly, a query interface to the database may be arranged to provide a search query capable of recognising one of these standard types. Property type keywords may be combined in any appropriate way e.g. "Office/warehouse", "Office and warehouse", "Office, warehouse, land", etc. provided the keywords appear somewhere in the string.

In an application relating to the UK commercial property market only, the result analyser 130 may restrict 'locality' to be one of: 'Inner London', 'Midlands', 'Scotland', 'Outer London', 'South West', 'Wales', 'Northern Home Counties', 'East Anglia', 'North West', 'N Ireland', 'Southern Home Counties', 'North East' or equivalent where used in other countries.

'Status', if used, may be restricted to one of 'AVAILABLE', 'UNDER OFFER', 'LET' or "SOLD".

Contacts table 305

The Contacts table 305 may be used by the database connector 140 to record any form of contact identifiable in the query results, whether vendor, owner, occupier, or simply a browser. Again, column names identified with an "*" are compulsory.

| Column Name | Column Type | Comments |
| --- | --- | --- |
| contact_id* | number(10) | A unique integer identifier for the contact, generated automatically |
| organisation* | varchar2(255) | Name of the organisation |
| branch | varchar2(255) | Name of the branch (e.g. Ipswich, SW, etc.), if applicable |
| telephone | varchar2(30) | Telephone number of contact |
| contact_postcode | varchar2(12) | Post code |
| contact_address* | varchar2(500) | Full address of contact, bar post code |
| contact_htmlref | varchar2(255) | A reference to an HTML page for the contact |

| Role table 310 | | |
|---|---|---|
| re_id* | number(10) | The real estate id |
| contact_id* | number(10) | The contact id |
| role_type* | char(30) | The role ot the contact |
| comments | varchar2(2000) | Comments associating a role contact to a property. |

The database connector 140 may create one record in the role table 310 for each link between a real estate table record and a contact table record, storing the respective ids in the re_id and contact_id fields.

Recognised role types, stored for reference in the Valid Roles table 315, may be, initially, "Vendor", "Owner", "Occupier", and "Client". The database connector 140 may implement a rule such that for each property, there must be at least one "Vendor" or an "Owner". Where the vendor and owner are one and the same, at least a "Vendor" entry must appear. Only one "Owner" is permitted. The database connector 140 may reject property details not complying with this rule, if not already filtered during analysis by the result analyser 130.

Sub-group table 320

The sub-group table 320 is optional and may be used by the database connector 140 to link records within the real estate table 300, for example where a building having several floors is advertised to be let. For example. a "parent" record in the real estate table 300 may show that the building has an overall floor area of 10000 sq. metres; the building may have 2000 sq. metres available over each of five floors, each floor (a "child") being recorded separately in the real estate table 300 table and linked to the parent record by means of a separate entry in the sub-group table 320.

| Column Name | Column Type | Comments |
|---|---|---|
| subgroup_id | number(10) | A unique integer reference number, generated automatically |
| parent_re_id | number(10) | id of the parent real_estate |
| child_re_id | number(10) | id of the child real_estate |
| comments | varchar2(2000) | Any notes about the sub-grouping |

The database connector 140 may implement a rule such that Real_estate table entries are allowed multiple parents and multiple children. In practice, it is expected that the majority of cases will be single parent with one or more children.

Requirements table 325 and Client Folder 330

The Requirements table 325 and Client Folder 330 are provided to enable a Client of the information access system to register with the information access system and to record requirement profiles in respect of products or services of particular interest to the Client. For example, for the commercial property information access system, the Requirements table 325 may have the following structure:

| Column Name | Column Type | Comments |
|---|---|---|
| client_id* | number(10) | A unique integer identifier for the client |
| contact_id | number(10) | id of the originating client |
| req_name* | varchar2(255) | A unique name assigned to the requirement |

-continued

| Column Name | Column Type | Comments |
|---|---|---|
| details | varchar2(2000) | The details of any special requirements e.g. KEY words |
| min_area | number(10) | A minimum floor area in sq m (sales area for retail) |
| max_area | number(10) | A maximum floor area in sq m (sales area for retail) |
| req_type | varchar2(500) | Valid types are as for real_estate |
| req_locality | varchar2(500) | Valid localities are as for real_estate |

As with the earlier tables, table entries under column names marked with an "*" are compulsory. Each requirement may be automatically assigned a unique identifier. A user may not have two requirements with the same identifier.

A client may record requirements in terms of references to particular properties already listed in the Real Estate table 300. One record may be created in the Client Folder 330 to reference each property identified as being of the type required by that client. The Client Folder 330 may have the following structure:

| Column Name | Column Type | Comments |
|---|---|---|
| client_id* | number(10) | id of the client |
| re_id* | number(10) | id of the real_estate |
| type | varchar2(10) | The type of folder relationship, e.g. "BOOKMARK". |
| notes | varchar2(2000) | Any notes for the client to store against the property |

Compulsory table entries are 'client_id' and 're_id'. Any 'type' can be used (or left blank). For example, a particular property may be recorded as a "bookmark".

Preferably, a user interface to the information access system may be provided for the use of Clients to record their requirements in the Requirements table 325 and to create references in the Client folder 330. The user interface may also provide a secure login procedure to control access to requirements information using known login techniques. A further table may be provided to record the identity of registered client users, under the control of a system administrator.

As described above, the Database Connector 140 may be enabled to identify new information as a result of a comparison between query results from the result analyser 130 and the present contents of the database 135. Preferably, on identifying new information, the database connector 140 may be enabled to perform a further comparison of the new information with the contents of the Requirements table 325 and, further, with information referenced in the Client Folder 330, to identify whether any of the new information matches a client's requirements. For example, for commercial property, the database connector 140 may firstly search, in respect of each client, newly identified property information for occurrences of any keywords specified by the client in the 'details' column of the Requirements table 325, then attempt to match property type, floor_area and locality if expressed as requirements by the client. A similar comparison may then be performed using information held in Real Estate table 300 records referenced in the Client Folder 330 by the client. Should any matches be found, the database connector 140 may collate a report listing references to the appropriate newly identified properties in respect of each Client for whom matches were found. Reports may be either Emailed to the respective Clients by the database connector 140, or held until the next time the client accesses the information access system. Alternatively, other methods may be used to alert the client to the existence of newly identified information of potential interest.

While the process of identifying new information and bringing it to the attention of clients has been described as a function of the database connector 140, this functionality may operate within a separate module of the information access system, enabled to check the database for new or amended information at any time and report findings to clients of the system.

While the database 135 may be implemented using the ORACLE relational database management system, other known relational database management products may be used with suitable adaptation of the database connector module 140.

Preferably, to improve the speed of access of the database 135, a number of index files may be generated by the database management system, under the control of the database connector 140, in respect of certain key fields. For example, with reference to the Real Estate table 300, an index may be created on the fields "re_id", "re_type" and "locality". With reference to the Contacts table 305, an index may be created on the field "contact_id". With reference to the Role table 310, an index may be created on the fields "re_id", "contact_id" and "role_type".

While particular embodiments of the information access system have been described in terms of a commercial property trading system, other applications of the information access system may be readily devised. Each application may employ a dedicated result analyser 130, database connector 140 and database 135 as required, within the scope of the invention.

What is claimed is:

1. An information access system comprising:
   a communications interface;
   query submission means;
   a query result analyser;
   information storage means; and
   triggering means;
   wherein the information access system is arranged, in operation, to respond to an output of the triggering means to do the following:
      using said communications interface, to establish a network connection to a predetermined network address;
      using said query submission means, to select a query from a set of one or more predetermined queries and to transmit the selected query, via the communications interface, over said network connection, according to a predetermined communications protocol;
      using said query result analyser, on receipt of data over said network connection in response to said transmitted query, to extract information of a predetermined type from the received data and to format the extracted information according to a common format; and
      using said information storage means to store the formatted information in an index,
   wherein the information storage means are arranged, on receipt and prior to storage of information extracted by the query result analyser, to compare said extracted information with information already stored in the index and to identify, within the extracted information, information not previously stored in the index.

2. An information access system according to claim 1, comprising a search engine arranged with access to retrieve information from the index in response to received search requests.

3. A property trading system, comprising an information access system according to claim 1.

4. An information access system according to claim 1, wherein the information storage means identifies, within the extracted information, new information not previously stored in the index.

5. An information access system according to claim 1, including requirements matching means arranged to compare predetermined information requirements with said new information and to output results of the comparison.

6. An information access system according to claim 1, wherein the information storage means compares the extracted information with information already stored in the index and identifies, based on the comparison, information to be deleted from the index.

7. A property trading system comprising:
   a communications interface;
   query submission means;
   a query result analyser;
   information storage means;
   trigger means; and
   a search engine;
   wherein the property trading system is arranged, in operation, to respond to an output of the triggering means to do the following:
      using said communication interface, to establish a network connection to a predetermined network address;
      using said query submission means, to select a query from a set of one or more predetermined queries and to transmit the selected query, via the communications interface, over said network connection, according to a predetermined communications protocol;
      using said query result analyser, on receipt of data over said network connection in response to said transmitted query, to extract information of a predetermined type from the received data and to format the extracted information according to a common format; and
      using said information storage means to store the formatted information in an index;
   wherein the search engine is arranged to retrieve information, stored in the index, in response to received property search requests; and
   wherein the information storage means are arranged, on receipt and prior to storage of information extracted by the query result analyser, to compare said extracted information with information already stored in the index and to identify, within the extracted information, information not previously stored in the index.

8. An information access system comprising:
   a store for storing query files, each query file having a uniform resource locator associated therewith;
   a query preparation module configured to read out a query file from said store, to determine the uniform resource locator associated with the read out query file, and to format a query request based on the read out query file;
   a network connection module configured to establish a network connection to a web server using the determined uniform resource locator and to then forward the formatted query request to the web server;

a query result analyzer module configured to process query results received from the web server and to output data based on the results of the processing; and a database connector configured to use the output data to update the store, wherein the database connector is arranged, on receipt and prior to using the output data to update the store, to compare the output data with the current data contents of the store and to identify, within the output data, data not currently stored in the store.

9. The system according to claim 8, wherein the query file read out from the store is determined in accordance with a predetermined search schedule.

10. The system according to claim 8, wherein the query preparation module is further configured to monitor the query results received from the web server to determine whether the query results are complete.

11. The system according to claim 10, wherein the query preparation module determines whether the query results are complete by detecting character strings.

12. The system according to claim 10, wherein the query preparation module formats a next page request that is forwarded to the web server by the network connection module if the query results received from the web server are not complete.

13. The system according to claim 12, wherein the read out query comprises data for defining the maximum number of pages of query results to be retrieved using next page requests.

14. The system according to claim 8, wherein the query request comprises multiple parts.

15. The system according to claim 8, wherein the query result analyzer module is configured to process query results to extract predetermined information entities.

16. The system according to claim 15, wherein the query result analyzer module is configured to translate terms used by the web site to describe the extracted information entities into standard terms for the information access system.

17. The system according to claim 8, wherein the output data comprises a data table of predetermined structure.

18. The system according to claim 8, wherein the database connector performs a comparison between the output data and current data contents of the store to detect changes to particular information records.

19. The system according to claim 18, wherein the database connector generates an alert if changes between the output data and the current data contents of the store are detected.

20. A property trading system, comprising an information access system according to claim 8.

* * * * *